(12) United States Patent
Oh

(10) Patent No.: US 7,836,270 B2
(45) Date of Patent: Nov. 16, 2010

(54) METHOD OF IMPROVING THE DETECTION OF OPENING AND METHOD FOR REDUCING THE BOOTING TIME OF A WIRELESS TERMINAL

(75) Inventor: Yoon-Jo Oh, Suwon-si (KR)

(73) Assignee: Samsung Electronics Co., Ltd (KR)

(*) Notice: Subject to any disclaimer, the term of this patent is extended or adjusted under 35 U.S.C. 154(b) by 261 days.

(21) Appl. No.: 11/511,200

(22) Filed: Aug. 28, 2006

(65) Prior Publication Data
US 2007/0192549 A1 Aug. 16, 2007

(30) Foreign Application Priority Data
Feb. 15, 2006 (KR) .................. 10-2006-0014676

(51) Int. Cl.
G06F 12/00 (2006.01)
G06F 13/00 (2006.01)
G06F 13/28 (2006.01)

(52) U.S. Cl. .................. 711/165; 711/154; 713/2

(58) Field of Classification Search .......... 711/154, 711/165; 713/2
See application file for complete search history.

(56) References Cited

U.S. PATENT DOCUMENTS

| 4,720,812 A | * | 1/1988 | Kao et al. | 713/2 |
| 5,043,942 A | * | 8/1991 | Iwata et al. | 365/185.13 |
| 6,591,340 B2 | | 7/2003 | Chopra et al. | |
| 7,395,397 B2 | * | 7/2008 | Ogawa | 711/165 |
| 2003/0028760 A1 | * | 2/2003 | Chang et al. | 713/2 |

FOREIGN PATENT DOCUMENTS

| KR | 1998-069985 | 10/1998 |
| KR | 10-1999-0085351 | 12/1999 |
| KR | 10-2002-0009564 | 2/2002 |
| KR | 10-2006-0042512 | 5/2006 |

* cited by examiner

*Primary Examiner*—Tuan V Thai
*Assistant Examiner*—Mark A Giardino, Jr.
(74) *Attorney, Agent, or Firm*—The Farrell Law Firm, LLP

(57) ABSTRACT

Disclosed is a method for reducing booting time of a wireless terminal by decreasing the time taken for copying the codes of the NAND memory to the RAM, and thus shortening the time taken for readying the wireless terminal. The method includes executing a program counter of the code region of a virtual memory, determining whether a page table contains the physical address of a first physical memory mapped by the corresponding virtual address of the virtual memory reached by the program counter, causing an abort handler to assign the physical address mapped by the corresponding virtual address to the page table if the page table does not contain the physical address mapped by the corresponding virtual address, copying the code of the corresponding virtual address for performing the booting mode at the corresponding physical address of the first physical memory, and repeating the previous steps to copy all the codes for performing the booting mode to the first physical memory.

11 Claims, 3 Drawing Sheets

METHOD OF IMPROVING THE DETECTION OF OPENING AND METHOD FOR REDUCING THE BOOTING TIME OF A WIRELESS TERMINAL

PRIORITY

This application claims priority under 35 U.S.C. §119 to an application entitled "Method for Reducing the Booting Time of a Wireless Terminal" filed in the Korean Intellectual Property Office on Feb. 15, 2006 and assigned Serial No. 2006-0014676, the contents of which are incorporated herein by reference.

BACKGROUND OF THE INVENTION

1. Field of the Invention

The present invention relates to a method for reducing the booting time of a wireless terminal so as to shorten the time required to ready the terminal for use.

2. Description of the Related Art

NAND memory used in wireless terminals has priority over NOR memory in price, storage capacity, and processing speed. However, complications exist for reading and writing because codes stored therein must be copied to the Random Access Memory (RAM) to execute. Namely, when starting the booting mode of the wireless terminal, all the codes stored in the NAND memory begin to be copied to the RAM, and thereafter the wireless terminal is set to the standby mode.

Such conventional wireless terminals require a long booting time because all the codes, including those not required for booting, must be copied to the RAM. In addition, functions other than copying can not be performed until the booting is completed. For example, the time taken for booting is about 8 seconds for copying the codes of 23M, having the capacity of 23 MB.

Moreover, even in the booting mode for a particular purpose such as clearing a file system and executing a test program, codes that are unnecessary for such purpose are all copied to the RAM, thereby increasing the copying time.

SUMMARY OF THE INVENTION

It is an object of the present invention to provide a method for reducing the booting time of a wireless terminal by decreasing the time taken for copying codes of the NAND memory to the RAM, and thus shortening the time taken for readying the wireless terminal.

According to an aspect of the present invention, a method for reducing booting time of a wireless terminal, includes executing a program counter of the code region of a virtual memory, determining whether a page table contains the physical address of a first physical memory mapped by the corresponding virtual address of the virtual memory reached by the program counter causing an abort handler to assign the physical address mapped by the corresponding virtual address to the page table if the page table does not contain the physical address mapped by the corresponding virtual address, copying the code of the corresponding virtual address for performing the booting mode at the corresponding physical address of the first physical memory, and repeating the previous steps to copy all the codes for performing the booting mode to the first physical memory.

According to another aspect of the present invention, a method for reducing the booting time of a wireless terminal, includes executing a program counter of the code region of a virtual memory so as to reach a virtual address corresponding to a physical address, determining whether a page table contains the physical address of a first physical memory mapped by the corresponding virtual address of the virtual memory reached by the program counter, generating an access abort so as to move the program counter to the virtual address at which an abort vector is stored if the page table does not contain the physical address mapped by the corresponding virtual address, causing the abort handler for controlling the abort vector to assign the physical address mapped by the corresponding virtual address to the page table, copying the code of the corresponding virtual address for performing the booting mode at the corresponding physical address of the first physical memory, moving the program counter to the virtual address at which the abort access has occurred, and repeating the previous steps to copy all the codes for performing the booting mode to the first physical memory so as to ready the wireless terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
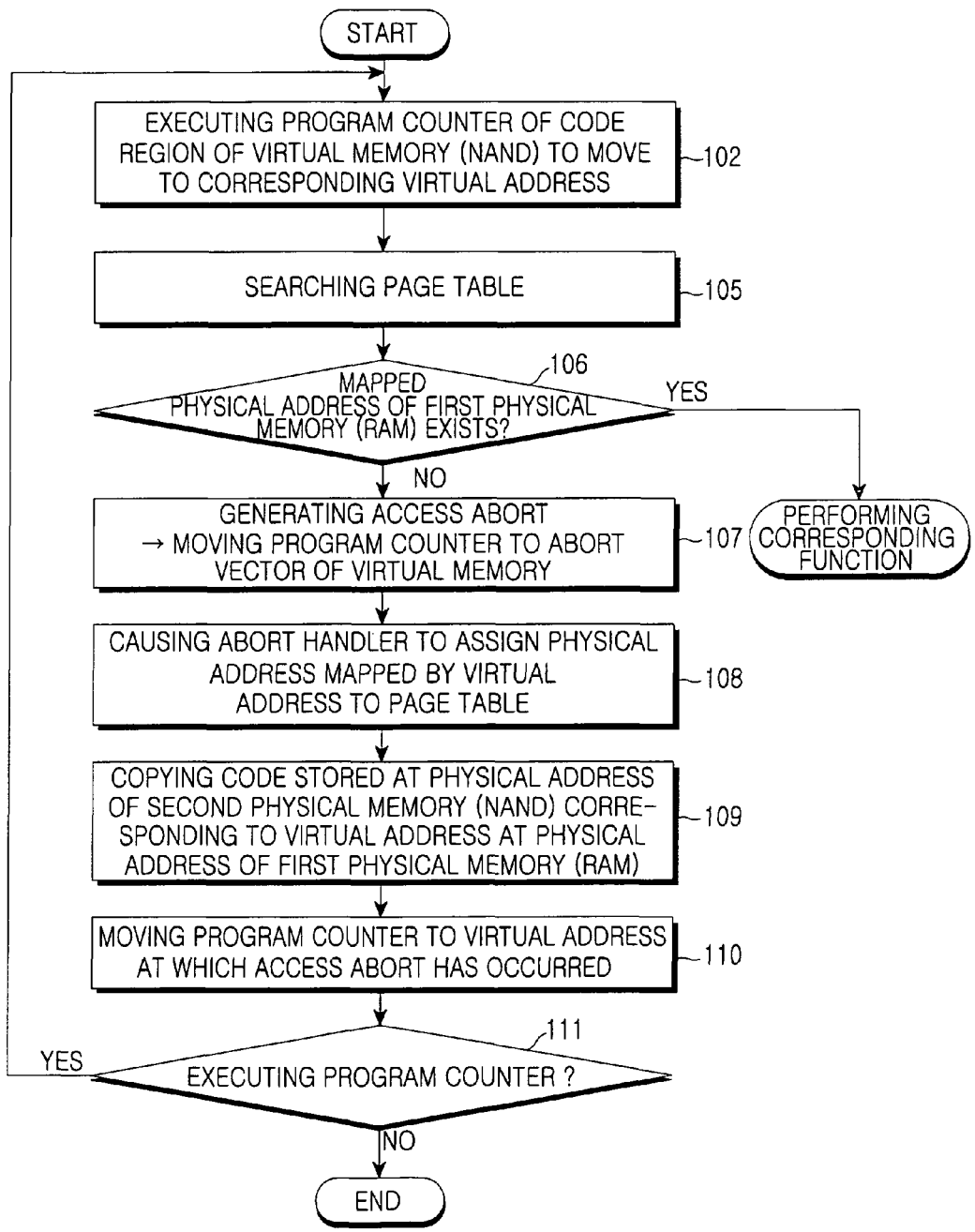
FIG. 1 is a flowchart illustrating the steps of performing the booting mode of a wireless terminal according to the present invention.

Preferred embodiments of the present invention are described herein with reference to the accompanying drawings. In the drawings, the same or similar elements are denoted by the same reference numerals even though they are depicted in different drawings. In the following description, well-known functions or constructions are not described in detail to avoid obscuring the invention with unnecessary detail.

The wireless terminal employing the inventive method includes a microprocessor (not shown) having a Memory Management Unit (MMU) that is controlled by an operating system without an MMU. The MMU translates a virtual address of a virtual memory to the corresponding physical address of a physical memory and controls the permission of accessing the virtual address. The virtual memory and physical memory indicate those of the RAM that is referred to as a first physical memory in this description. The NAND memory storing the codes to be copied to the first physical memory in the booting mode is referred to as a second physical memory.

The MMU includes a page table that is referred to for mapping the virtual address to the corresponding physical address. The page table stores only the essential codes for controlling the MMU without the virtual address and the physical address mapped by the virtual address is stored in advance.

Figure 2:
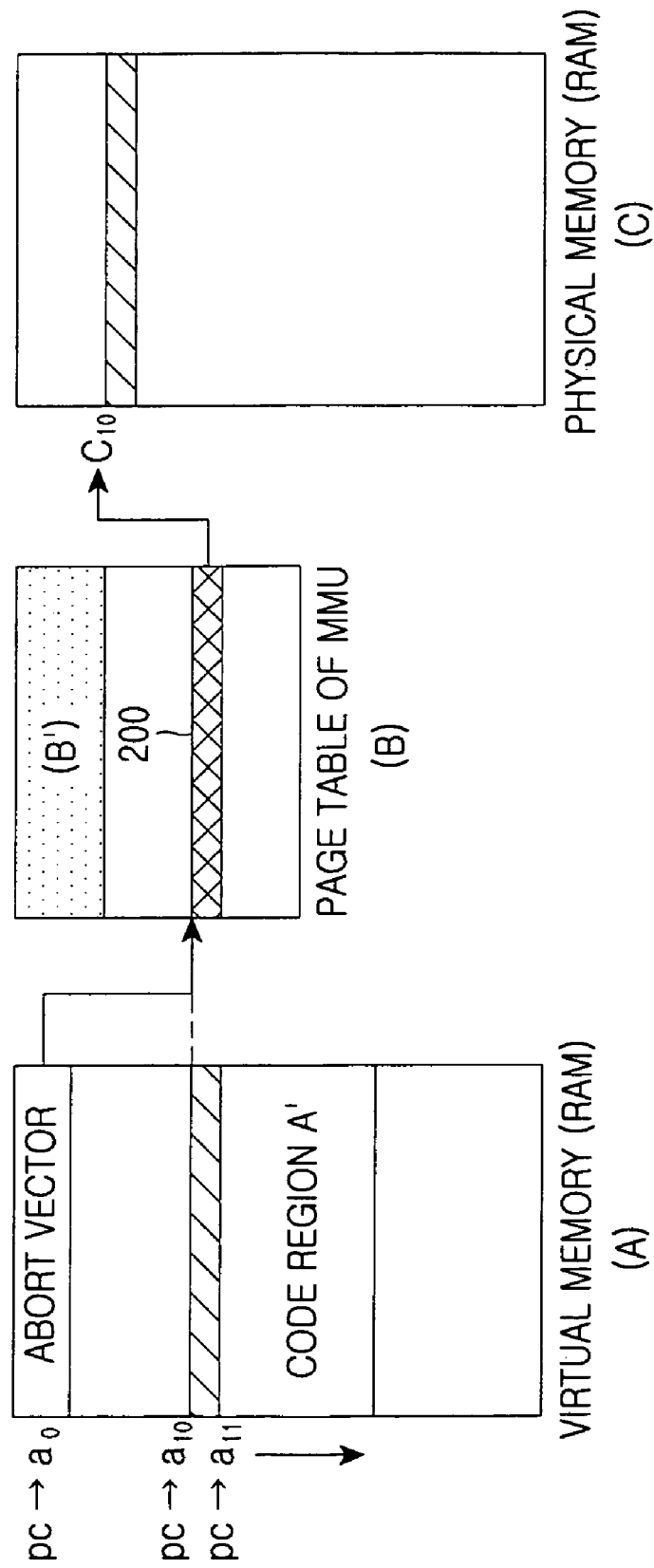
FIG. 2 is a block diagram illustrating the operation of copying the codes of a virtual memory to a physical memory.

Referring to FIGS. 1 and 2, a description is provided for starting the booting of the wireless terminal, with the microprocessor controlling the procedure of copying the codes necessary for the booting mode stored in the second physical memory of NAND (not shown) to the first physical memory of RAM.

The microprocessor controls execution in step 102 of a Program Counter (PC) of a code region A' of a virtual memory A of the RAM so as to move sequentially from virtual address $a_{10}$ representing the beginning of the code region A'. After designating the virtual address $a_{10}$ by the PC in step 102, the microprocessor controls in step 105 the MMU to search a page table B so as to detect the physical address of the first physical memory C mapped by the virtual address $a_{10}$.

The page table B comprises a region B' storing only the essential codes necessary for controlling the MMU, and the other empty region without the virtual and the physical address stored in advance, and therefore the microprocessor detects in step 106 whether there is a physical address of the first physical memory C mapped by the virtual address $a_{10}$. If a physical address of first physical memory exists, the method proceeds to step 107 to generate an access abort.

According to the generation of the access abort in step 107, the microprocessor controls the PC to move to the virtual address $a_0$ where an abort vector has been stored. Then the abort handler for controlling the abort vector determines whether the abort has been caused by an actual error or by a translation fault intentionally made in the code region A'. If the abort has been caused by translation fault, the abort handler assigns in step 108 the physical address $c_{10}$ mapped by the virtual address $a_{10}$ at which the access abort has occurred to the page table B by 1 Kbyte.

If the abort handler assigns the physical address $c_{10}$ mapped by the virtual address $a_{10}$ to a given entry 200 of the page table B, the MMU translates the virtual address $a_{10}$ to the corresponding physical address $c_{10}$ based on the physical address assigned to the page table. Then the microprocessor searches in step 109 the physical address of the second physical memory of NAND corresponding to the virtual address $a_{10}$ of the virtual memory A to copy the code for performing the booting mode stored at the physical address of the second physical memory at the corresponding physical address $c_{10}$ of first physical memory C. After completing the procedure of copying in the step 109, the microprocessor controls in step 110 the PC to move to the virtual address $a_{10}$ at which the access abort has occurred.

If the PC moves to the last virtual address of the code region A' of the virtual memory by repeating steps 102 to 110 to terminate the process, the microprocessor controls in step 111 the wireless terminal to transfer to the standby mode. Then the microprocessor performs the background processing to copy the remaining codes stored in the second physical memory to the first physical memory C. In this case, the background processing may perform the copying procedure with reference to the physical address mapped by the corresponding address assigned by the abort handler to the page table as shown in FIG. 1. Accordingly, the booting time is considerably reduced because the codes for the booting mode among the whole codes stored in the second physical memory of NAND are only copied to the RAM.

Figure 3:
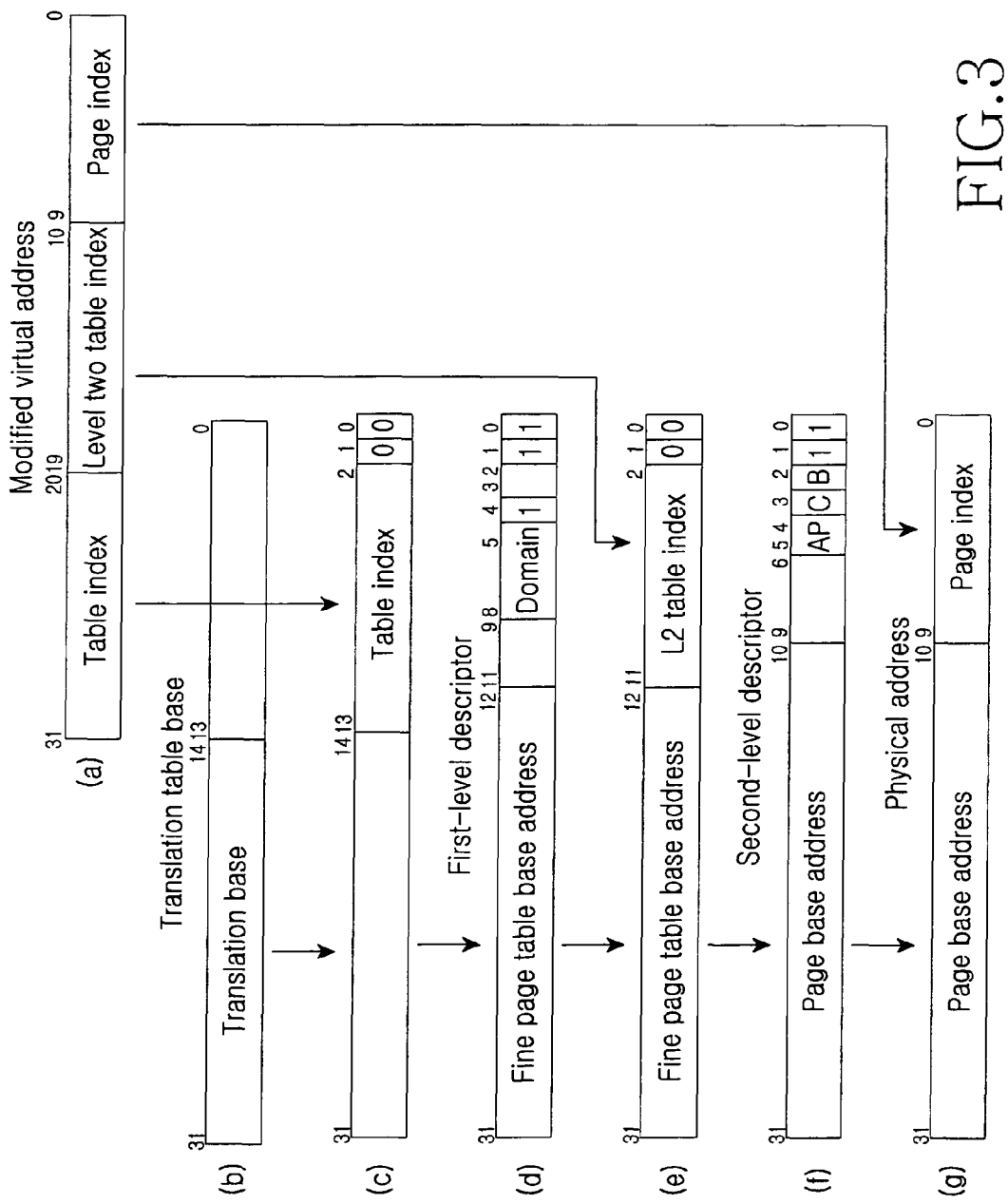
FIG. 3 is a block diagram illustrating the translation of a virtual address of a virtual memory to the corresponding physical address.

FIG. 3 illustrates the operation of translating the virtual address of the virtual memory to the physical address mapped by the virtual address. Conventionally, the page table is assigned in advance with the virtual addresses of the virtual memory and the physical addresses mapped by the virtual addresses, so that, the booting mode being started, the whole codes stored in the code region of the virtual memory of NAND are all copied to the physical memory of RAM with reference to the page table. However, the inventive method enables the MMU to translate the virtual address to the physical address with reference to the page table as shown in steps (a) to (g) in FIG. 3.

Describing respectively the steps of (a) to (g) in FIG. 3, "a" is the field for representing the actual virtual address used by the user of the wireless terminal, "b" is the field for finding the start page table among a plurality of page tables, "c" is the field for distinguishing the indexes stored in the start page table, "d" is the field for finding the start address of the page table corresponding to a particular one of the indexes of the start page table, "e" is the field for finding the address of a particular one of the indexes stored in the corresponding page table, "f" is the field for representing the address corresponding to the physical address of the physical memory, and "g" is the field for representing the actual physical address of the physical memory.

According to the present invention, the table page is kept empty instead of being assigned with the virtual and physical addresses in advance until the abort handler assigns particular virtual and physical addresses to the page table whenever accessing the memory. In this case, the abort handler assigns only the field (d) of FIG. 3 for the corresponding virtual address and the field (e) of FIG. 3 for the physical address to the page table, so that the MMU may translate the corresponding virtual address to the corresponding physical address.

As described above, the inventive method considerably reduces the booting time of the wireless terminal because the codes required to perform the booting mode are only copied from the second physical memory of NAND to the RAM. This also considerably reduces the time required for and cost of producing the wireless terminal.

While the invention has been shown and described with reference to certain preferred embodiments thereof, it will be understood by those skilled in the art that various changes in form and details may be made therein without departing from the spirit and scope of the invention, as defined by the following claims.

What is claimed is:

1. A method for reducing booting time of a wireless terminal, comprising:
   updating a program counter of a code region of a virtual memory;
   determining whether a page table contains a physical address of a first physical memory mapped by a corresponding virtual address of said virtual memory reached by said program counter;
   causing an abort handler to assign the physical address mapped by the corresponding virtual address to said page table if said page table does not contain the physical address mapped by the corresponding virtual address;
   copying code of the corresponding virtual address for performing a booting mode at the corresponding physical address of said first physical memory; and
   repeating the previous steps to copy all codes required for performing the booting mode to the first physical memory,
   wherein, during performance of the booting mode, only codes for performing the booting mode are copied to the first physical memory, and
   wherein, when the booting mode is started, the page table includes only address information indicating codes controlling a Memory Management Unit (MMU).

2. The method of claim 1, wherein said virtual memory and first physical memory correspond to a Random Access Memory (RAM).

3. The method of claim 1, wherein said page table is to map the virtual address of said virtual memory to the corresponding physical address of said first physical memory, said page table not being assigned in advance with the corresponding physical address of said first physical memory.

4. The method of claim 1, wherein the step of assigning the physical address to said page table comprises:
   generating an access abort if said page table does not contain the physical address mapped by the corresponding virtual address;
   moving said program counter to the virtual address at which an abort vector is stored; and
   causing said abort handler to assign said physical address mapped by said corresponding virtual address to said page table.

5. The method of claim 1, wherein the step of copying code of the corresponding virtual address for performing the booting mode at the corresponding physical address of said first physical memory comprises:
   translating said virtual memory to said corresponding physical address if said page table is allocated for said corresponding physical address mapped by said virtual address;
   searching the physical address of a second physical memory corresponding to the virtual address of said virtual memory; and
   copying code stored at the corresponding physical address of the second physical memory for performing the booting mode at the corresponding physical address of said first physical memory.

6. The method of claim 5, wherein said second physical memory is a NAND memory.

7. A method for reducing booting time of a wireless terminal, comprising:
   updating a program counter of a code region of a virtual memory so as to reach a virtual address corresponding to a physical address;
   determining whether a page table contains the physical address of a first physical memory mapped by the corresponding virtual address of said virtual memory reached by said program counter;
   generating an access abort so as to move said program counter to the virtual address at which an abort vector is stored if said page table does not contain the physical address mapped by the corresponding virtual address;
   causing an abort handler for controlling said abort vector to assign said physical address mapped by said corresponding virtual address to said page table;
   copying code of the corresponding virtual address for performing a booting mode at the corresponding physical address of said first physical memory;
   moving said program counter to the virtual address at which said abort access has occurred; and
   repeating the previous steps to copy all the codes required for performing the booting mode to the first physical memory to ready said wireless terminal,
   wherein, during performance of the booting mode, only codes for performing the booting mode are copied to the first physical memory, and
   wherein, when the booting mode is started, the page table includes only address information indicating codes controlling a Memory Management Unit (MMU).

8. The method of claim 7, wherein said virtual memory and first physical memory correspond to a Random Access Memory (RAM).

9. The method of claim 7, wherein said page table is to map the virtual address of said virtual memory to the corresponding physical address of said first physical memory, said table page not being assigned with the corresponding physical address of said first physical memory.

10. The method of claim 7, wherein the step of copying code of the corresponding virtual address for performing the booting mode at the corresponding physical address of said first physical memory comprises:
    translating said virtual memory to said corresponding physical address if said page table is allocated for said corresponding physical address mapped by said virtual address;
    searching the physical address of a second physical memory corresponding to the virtual address of said virtual memory; and
    copying code stored at the corresponding physical address of the second physical memory for performing the booting mode at the corresponding physical address of said first physical memory.

11. The method of claim 10, wherein said second physical memory is a NAND memory.

* * * * *